United States Patent [19]

Corn

[11] Patent Number: 5,651,605
[45] Date of Patent: Jul. 29, 1997

[54] VANITY MIRROR ASSEMBLY

[76] Inventor: Jack E. Corn, 1644 S. Jamestown, Tulsa, Okla. 74112-6832

[21] Appl. No.: 511,246

[22] Filed: Aug. 4, 1995

[51] Int. Cl.$^6$ ............................................. B60Q 1/26
[52] U.S. Cl. ........................ 362/83.1; 362/136; 362/137; 362/141
[58] Field of Search ........................... 362/83.1, 135, 362/136, 137, 141; 132/296, 301, 304; 296/97.2, 97.5

[56] References Cited

U.S. PATENT DOCUMENTS

| | | | |
|---|---|---|---|
| 4,469,365 | 9/1984 | Marcus et al. | 296/37.7 |
| 4,652,982 | 3/1987 | Flowerday | 362/136 X |
| 4,674,789 | 6/1987 | Watjer et al. | 296/97 R |
| 4,794,497 | 12/1988 | Jonsas et al. | 362/143 |
| 4,824,159 | 4/1989 | Fluharty et al. | 296/278 |
| 4,867,498 | 9/1989 | Delphia et al. | 296/37.7 |
| 4,979,079 | 12/1990 | Tawaraya | 362/135 |
| 5,050,922 | 9/1991 | Falcoff | 296/37.7 |
| 5,174,644 | 12/1992 | Hermansson et al. | 362/83.1 |
| 5,219,199 | 6/1993 | Smith et al. | 296/97.8 |

*Primary Examiner*—Stephen F. Husar
*Attorney, Agent, or Firm*—Head, Johnson & Kachigian

[57] ABSTRACT

A vanity mirror assembly having a frame with a pair of opposed tracks. A panel includes a pair of parallel rails which are slidable in the opposed tracks. A mirror slidable in the opposed tracks is hinged to the panel. The panel and the mirror are moveable between a storage position wherein the mirror and panel are aligned in the same plane within the frame and a use position wherein the mirror is withdrawn from the frame and in angular relation to the panel.

18 Claims, 5 Drawing Sheets

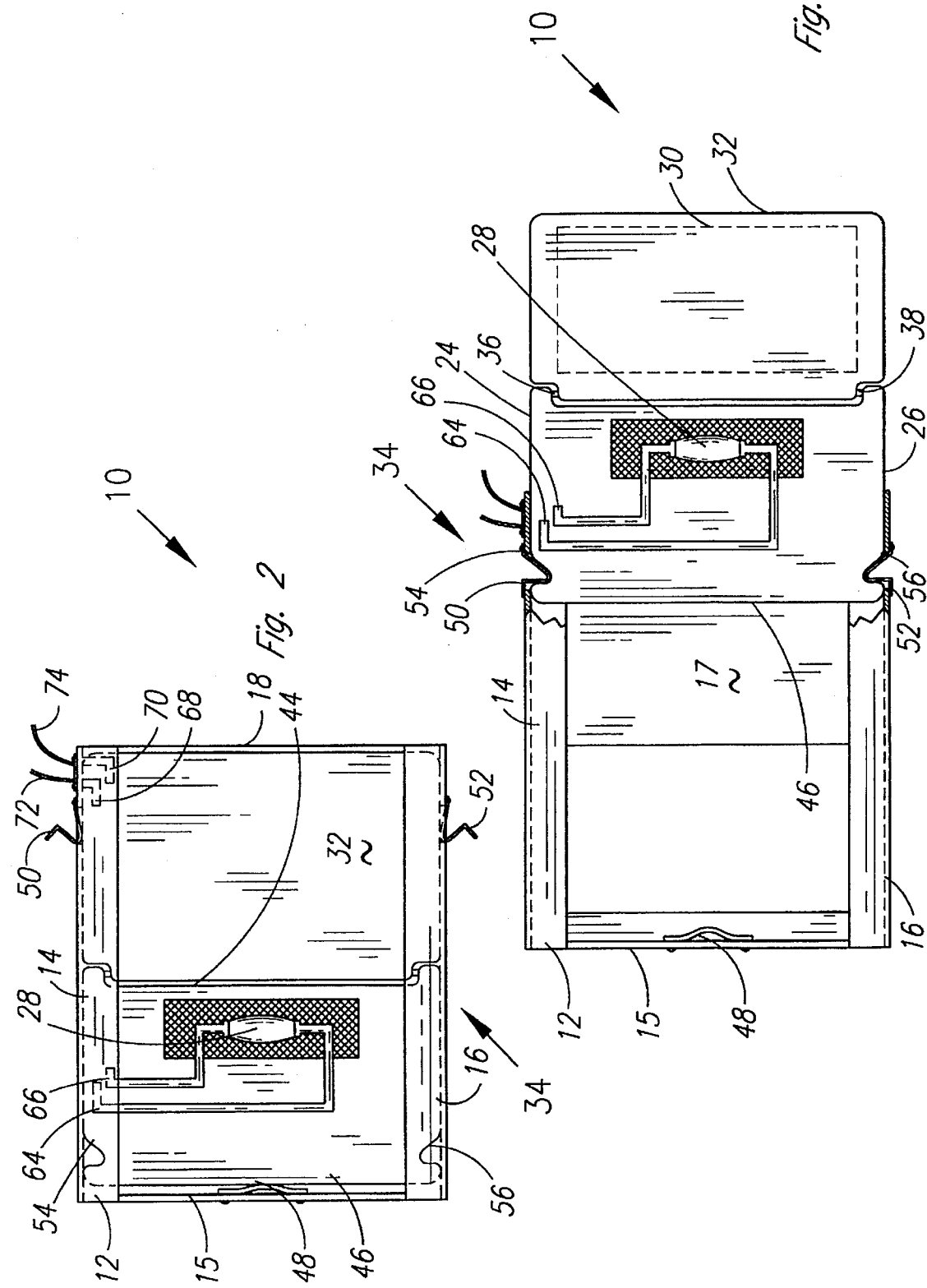

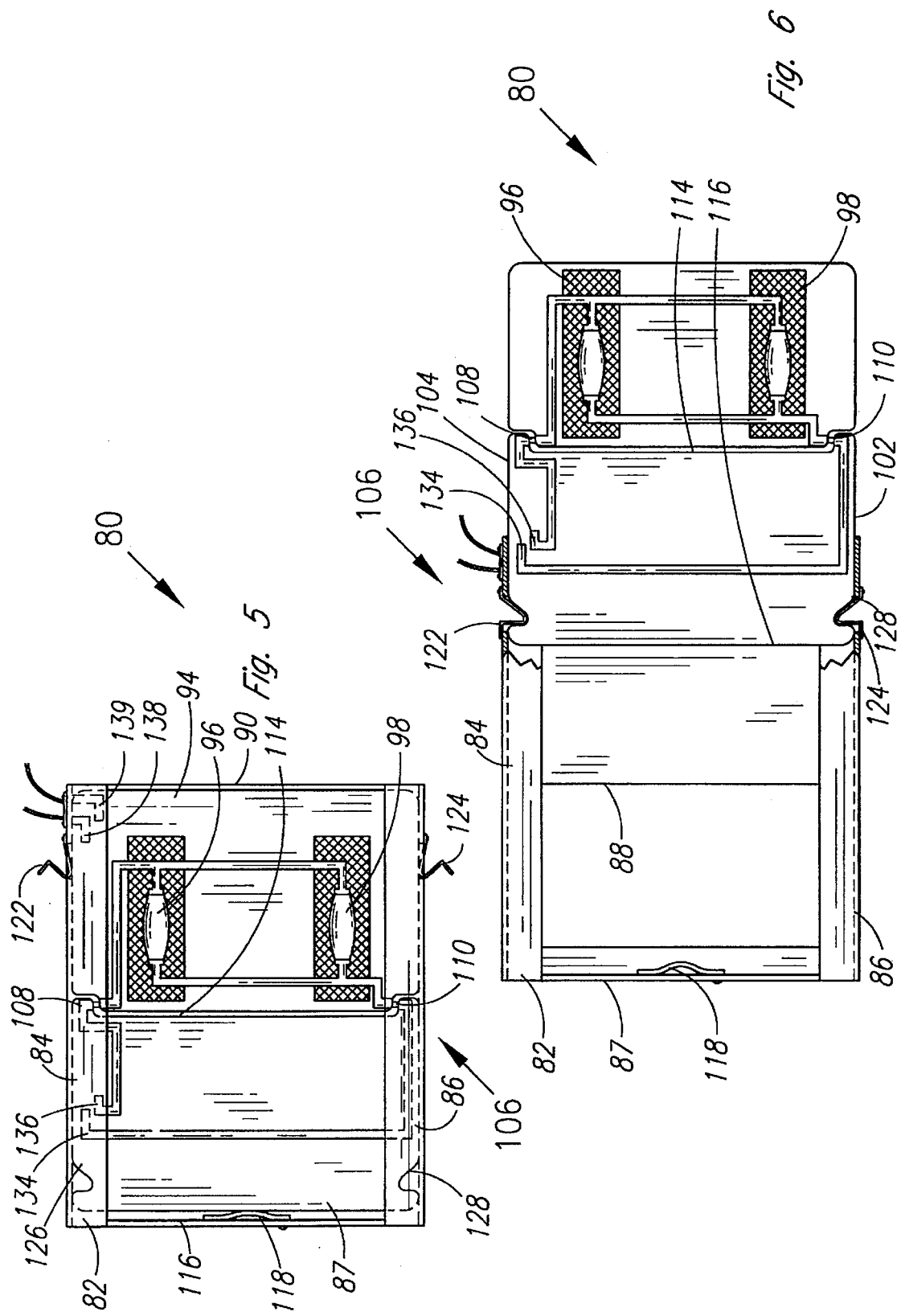

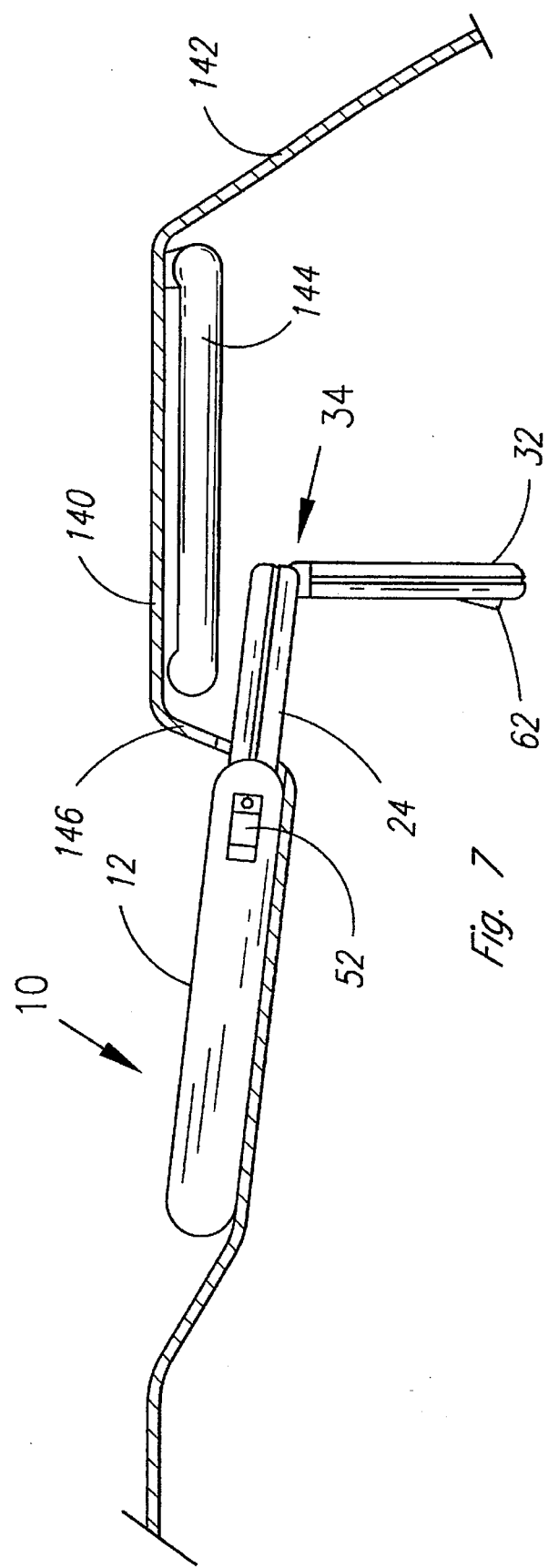
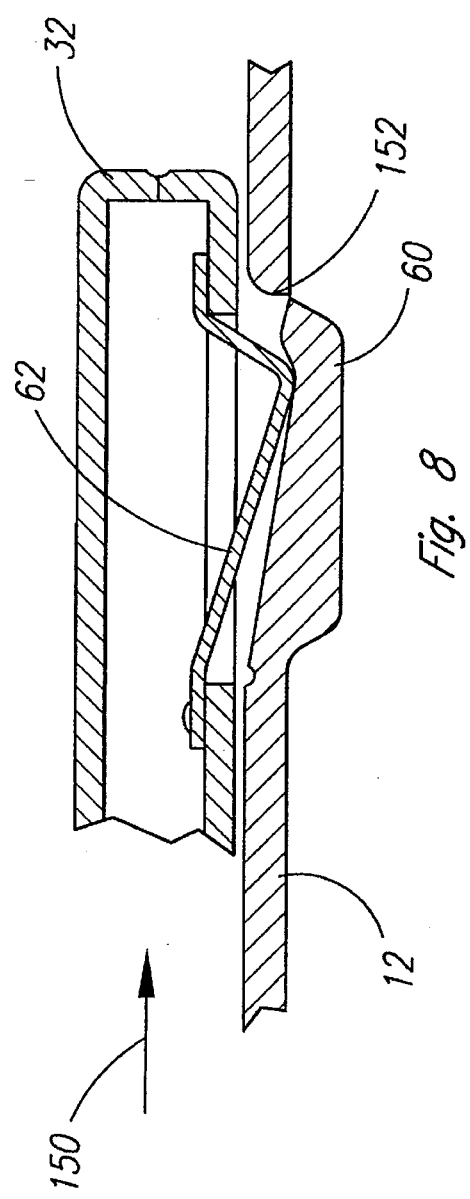

VANITY MIRROR ASSEMBLY

BACKGROUND OF THE INVENTION

1. Field of the Invention

The present invention is directed to a vanity mirror assembly for vehicles. In particular, the present invention is directed to a vanity mirror assembly having a storage position wherein the mirror is completely retracted within a frame and a use position wherein the mirror is moveable linearly out of the frame and also movable radially.

2. Prior Art

Vanity mirror assemblies in vehicles have been well known over a number of years. Heretofore, vanity mirrors contained a mirror housing which hinged to allow for radial movement of the mirror. Variations on this principle may be seen in Fluharty et al. (U.S. Pat. No. 4,824,159) wherein the vanity mirror pivots between a storage position substantially flush with the vehicle roof line and a use position. The mirror pivots about two axes.

In the vehicle forward seats, the vanity mirror is often mounted on the backside of the sunvisor. To use the mirror, the sunvisor must be moved down and then the cover of the mirror opened. The mirror adds additional weight to the sunvisor and, if lighted, requires the sunvisor to be wired. Often, ideal placement of the sunvisor does not result in ideal placement of the mirror. In some cases, the user must lean forward to use the mirror on the sunvisor. Additionally, the user must rotate the visor panel which is typically much larger than the mirror, just to use the mirror.

In the rear seats of some vehicles, a vanity mirror assembly is mounted parallel to the roof line within a frame. The mirror pivots about an axis into the use position.

Lights have occasionally been provided in conjunction with vanity mirrors although some lights on the mirror housing may glare in the user's eyes. A variation of the standard light is shown in Hermansson et al. (U.S. Pat. No. 5,174,644) which shows a light unit mounted in the roof partially covered when the mirror is in the stored position.

In today's vehicles, it is also aesthetically desirable to have a streamlined appearance and to keep accessories out of view until use.

Accordingly, it is a principal object and purpose of the present invention to integrate a vanity mirror assembly into the headliner or overhead console of a vehicle.

It is a further object and purpose of the present invention to provide a vanity mirror assembly which is stored out of sight during non-use and may be simply and easily extracted for use.

It is a further object and purpose of the present invention to provide a vanity mirror assembly which is lighted only during use.

It is a further object and purpose of the present invention to provide a vanity mirror assembly which is both compact and streamlined.

It is an additional object and purpose of the present invention to provide a vanity mirror assembly which operates independently of the vehicle sunvisor, so that the sunvisor is without the weight of the mirror and without the wiring for a light.

SUMMARY OF THE INVENTION

The vanity mirror assembly of the present invention includes a frame having a pair of opposed and parallel tracks. A flat panel may be inserted and withdrawn from an open end of the frame. The flat panel includes a pair of opposed, parallel rails which are slidable within the tracks.

A mirror is retained within a mirror housing. The mirror and its housing are connected to the flat panel by a hinge mechanism which provides an axis perpendicular to the parallel rails of the panel and in the same plane of the panel. The mirror housing is likewise slidable in the tracks of the frame. The hinge mechanism permits the mirror to move radially between a position aligned with and parallel to the panel and a position in angular relation to the panel.

The flat panel has a trailing edge. The frame includes a spring which engages the panel trailing edge when in the stored position. The spring, thus, provides an outward force urging the panel, and in turn the mirror and its housing, outward from the stored position.

The vanity mirror assembly is designed to allow the panel to move in the tracks of the frame but prevent the panel from being completely removed from the frame. The frame includes a pair of stop springs positioned to provide a force moving the springs to interrupt the opposed tracks. The stop springs ride along the panel rails of the flat panel. When the panel is withdrawn from the frame, the stop springs will engage recesses in the panel rails. The stop springs, thus, prevent the panel from being completely withdrawn from the frame.

To utilize the vanity mirror assembly, a button, which is readily accessible, will be depressed to release a latch on the mirror housing. The force of a spring will then urge and move the panel and mirror housing linearly outward slightly from the frame open end. The user will then be able to grasp the mirror housing and move the housing and panel linearly from the storage position to the withdrawn position. The mirror housing and its accompanying mirror will then be moved radially from the position aligned with the panel to a position in angular relation to the panel.

BRIEF DESCRIPTION OF THE DRAWINGS

FIGS. 2 and 3 are top views of the vanity mirror assembly shown in FIG. 1, with FIG. 2 illustrating a panel and mirror in a stored position and FIG. 3 illustrating the panel and mirror moved out from its frame;

FIG. 5 and FIG. 6 are top views of the vanity mirror assembly shown in FIG. 4 with the panel and mirror in the stored position in FIG. 5 and the panel and mirror in the withdrawn position in FIG. 6;

FIG. 7 is a partial sectional view of a headliner of a vehicle with the vanity mirror assembly of the present invention installed; and FIG. 8 is a detailed, sectional view of a latch which retains the mirror in the frame of the vanity mirror assembly when in the stored position.

DETAILED DESCRIPTION OF THE PREFERRED EMBODIMENTS

Figure 1:
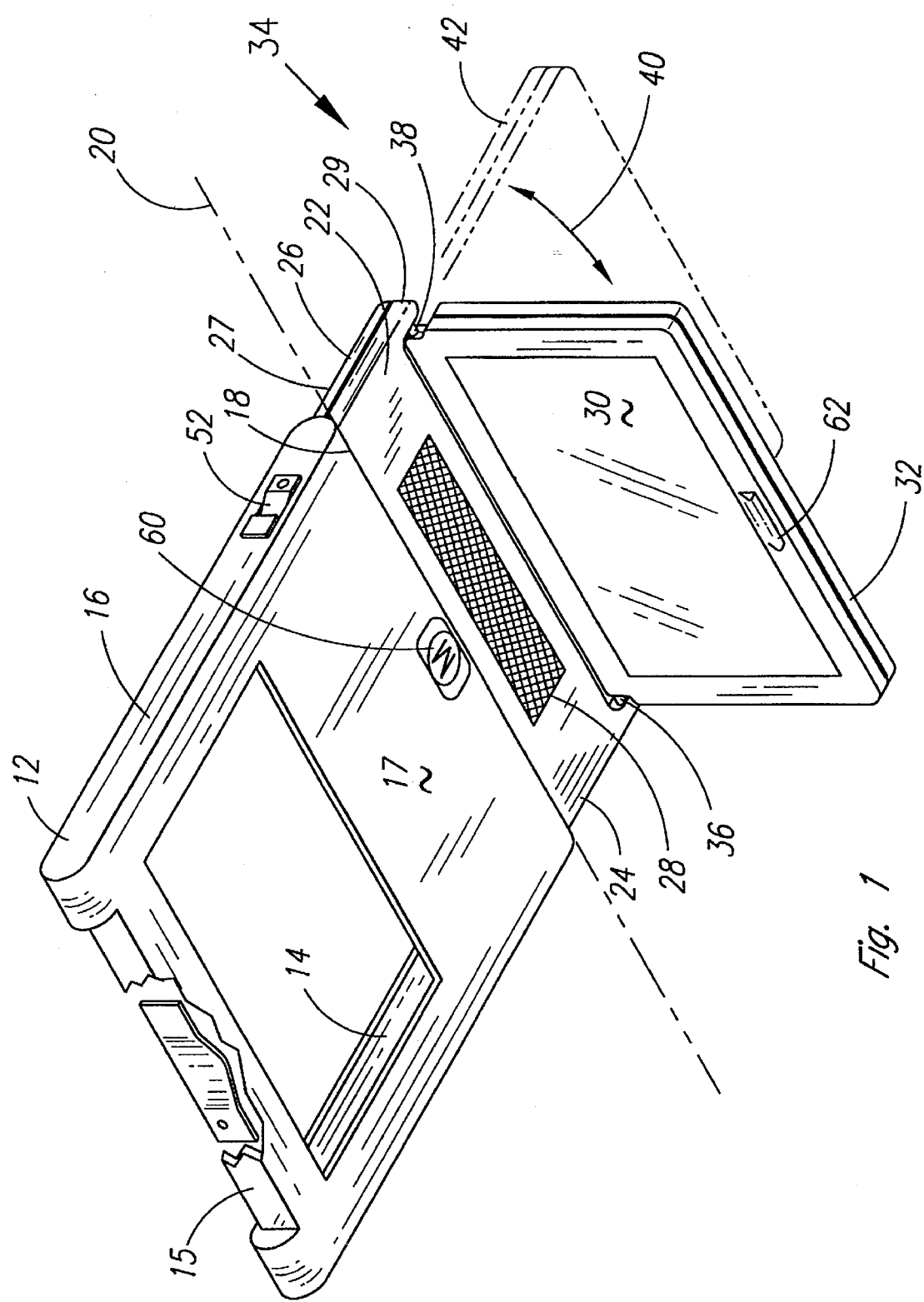
FIG. 1 is a perspective view of a preferred embodiment of a vanity mirror assembly constructed in accordance with the present invention.

Referring to the drawings in detail, FIG. 1 illustrates a perspective view of a vanity mirror assembly 10 with at least one area partially cut away. The vanity mirror assembly 10 includes a frame 12 having a pair of opposed, parallel tracks 14 and 16. The interior of track 14 is visible in the perspective view of FIG. 1. In the present embodiment, cross support 15 traverses the frame 12. The frame 12 may also include an integrated protective shield 17 which covers the mirror when in the storage position as will be appreciated from the description below. The frame can take various dimensions and can be made of any suitable material such as plastic.

As will be seen herein, the frame 12 will be recessed and held within a headliner of a vehicle. The frame 12 includes an open end 18 which would correspond to an opening in the vehicle headliner, illustrated by dashed line 20. A flat panel 22 may be inserted and withdrawn from the open end 18 of the frame 12. The flat panel 22 includes a pair of opposed, parallel rails 24 and 26 which are slidable within the tracks 14 and 16, respectively.

The flat panel 22 may be constructed of two sections, such as a snap together top 27 and bottom 29 which encloses the optional light assembly.

In the embodiment shown in FIGS. 1, 2 and 3, the flat panel 22 includes an electric light 28 recessed into the panel. The light 28 illuminates the user for ease of viewing in low light conditions. In this embodiment, the light 28 is not directly facing the user and prevents glare. It will be understood, however, that a basic version of the present invention may be constructed and operate without a light.

A mirror 30 is retained within a mirror housing 32. The mirror housing has the same width as the panel and is also slidable in the tracks of the frame. The mirror 30 and its housing 32 are connected to the flat panel 22 by a hinge mechanism 34. The hinge mechanism 34 includes a pair of hinge pins 36 and 38 which provide an axis perpendicular to the parallel rails 24 and 26 of the panel and in the plane of the panel.

The hinge mechanism 34 permits the mirror 30 to move radially between a position aligned with and parallel to the panel, as illustrated by dashed lines 42, and a position in angular relation to the panel as shown in FIG. 1. The radial movement of the mirror and housing are illustrated by arrow 40. It will be understood that other hinges might be employed to achieve the same purpose.

FIG. 2 is a top view of the vanity mirror assembly 10 in the storage position with the top half 27 of the panel 22 removed for clarity. With reference to FIGS. 2 and 3 and continuing reference to FIG. 1, the vanity mirror assembly 10 is shown in the storage position in FIG. 2 and in the withdrawn position in FIG. 3.

The flat panel 22 has a leading edge 44 and a trailing edge 46. The frame 12 includes a flat spring 48 riveted to or on cross support 15 which engages the trailing edge 46 of the panel when in the stored position. The flat spring 48, thus, provides an outward force urging the panel 22, and in turn the mirror and its housing, outward from the stored position shown in FIG. 2 toward the withdrawn position shown in FIG. 3.

The vanity mirror assembly 10 is designed to allow the panel to move in the frame but prevent the panel 22 from being completely removed from the frame. The frame 12 includes a pair of stop springs 50 and 52. The stop springs 50 and 52 are positioned to provide a force to move the springs into a position interrupting the opposed tracks 14 and 16, respectively. The stop springs 50 and 52 shown in the preferred embodiment, are flat springs riveted to the side of the frame 12. They ride along the panel rails 24 and 26 of the flat panel 22. When the panel is withdrawn from the frame, the stop springs 50 and 52 will engage recesses 54 and 56 in the panel rails 24 and 26, respectively. The stop springs 50 and 52 will thus prevent the panel 22 from being completely withdrawn from the frame.

In order to utilize the vanity mirror assembly 10, a button 60 which is readily accessible, will be depressed to release a latch 62 on the mirror housing. The button 60 may contain an optional light (not shown) so that the button may be found easily in the dark. The force of the spring 48 will then urge and move the panel and mirror housing outward slightly from the frame open end 18. The user will then be able to grasp the mirror housing 32 and move the housing and flat panel 22 linearly from the storage position shown in FIG. 2 to the withdrawn position shown in FIG. 3. Once the mirror is withdrawn from the frame, the mirror housing, and its accompanying mirror, will then be moved radially from a position aligned with the panel, as shown in FIG. 3, to a position in angular relation to the panel as shown in FIG. 1. The angular position of the mirror can be adjusted to suit the height and position of the user.

Once the user has completed usage of the mirror, the reverse procedure is performed. The mirror housing is moved radially back to a position aligned with the panel. The mirror housing and panel are then moved linearly back into the frame.

As best seen in FIGS. 2 and 3, the electric light 28 includes a pair of leads such as copper strips 64 and 66, one being positive and the other negative. When the panel 22 is extracted, the leads 64 and 66 will connect with contacts 68 and 70 in the frame. The leads 64 and 66 are curved either up or down through a slot in the top and bottom cover 27, 29, thus allowing contact with 68 and 70 which are either placed at the base or top of the track of the frame. The contacts are connected with the electrical power of the vehicle through wires 72 and 74. Voltage is, thus, supplied to the light.

In this manner, the light 28 is only illuminated when the panel is withdrawn from the frame.

Figure 4:
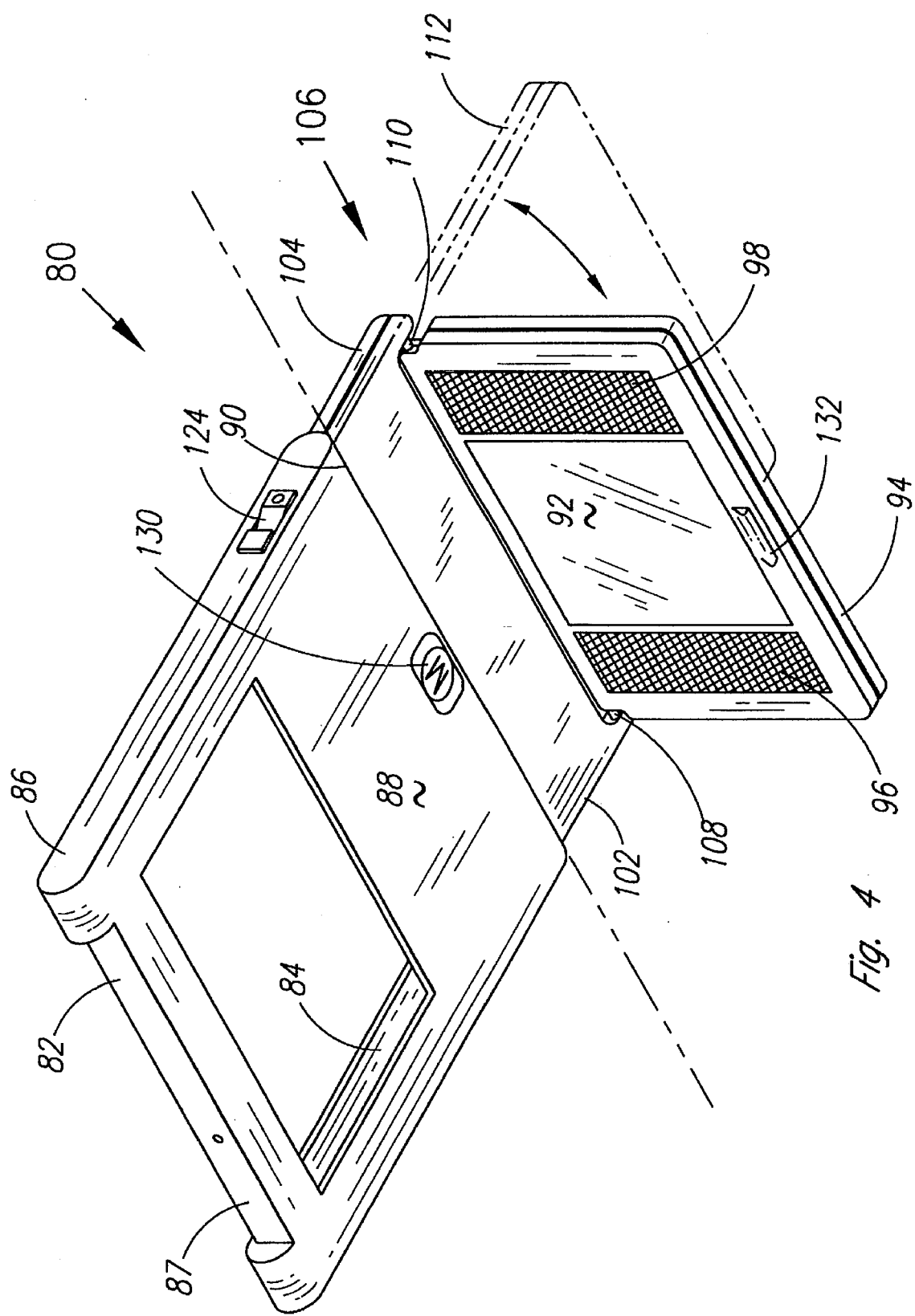
FIG. 4 is an alternate embodiment of the vanity mirror assembly.

FIGS. 4, 5 and 6 illustrate an alternate embodiment 80 of the vanity mirror assembly.

The vanity mirror assembly 80 includes a frame 82 having a pair of opposed, parallel tracks 84 and 86. Cross support 87 traverses the frame.

The frame 82 also includes a protective shield 88 which covers the mirror when in the storage position. The frame includes an open end 90 which would correspond to an opening in the vehicle headliner (not shown). A flat panel 100 may be inserted and withdrawn from the open end 90 of the frame 82. The flat panel 100 includes a pair of opposed, parallel rails 102 and 104 which are slidable within the tracks 84 and 86, respectively of the frame.

In the embodiment shown in FIGS. 4, 5 and 6, a mirror 92 is retained within a mirror housing 94. The mirror housing has the same width as the panel and is also slidable in the tracks of the frame. The mirror housing 94 includes a pair of electric lights 96 and 98 recessed into the mirror housing 94.

The mirror 92 and its housing 94 are connected to the panel 100 by a hinge mechanism 106. Hinge mechanism 106 includes a pair of hinge pins 108 and 110 which provide an axis perpendicular to the parallel rails 102 and 104 of the panel and in the plane of the panel. The hinge mechanism 106 permits the mirror to move radially between a position aligned with and parallel to the panel as illustrated by dashed lines 112, and a position in angular relation to the panel as shown in FIG. 4. Other hinges are, of course, possible to achieve the same purpose.

FIG. 5 is a top view of the vanity mirror assembly with one half of the panel removed for clarity. In FIG. 5, the vanity mirror assembly 80 is shown in the storage position while in FIG. 6, the mirror and panel of the vanity mirror assembly are shown in the withdrawn position.

The flat panel 100 has a leading edge 114 and a trailing edge 116. The cross support and frame 82 includes a spring 118 which engages the trailing edge 116 of the panel 100 when it is in the storage position. The spring 118, thus, provides an outward force urging the panel, and in turn the mirror and its housing, outward from the stored position shown in FIG. 5 toward the withdrawn position in FIG. 6.

The vanity mirror assembly 80 is designed to allow the panel to move in the tracks but prevent the panel 100 from being completely removed from the frame. The frame includes a pair of stop springs 122 and 124.

The stop springs 122 and 124 are positioned to provide a force to move the springs to interrupt the opposed tracks 84 and 86, respectively. The stop springs 122 and 124 ride along the panel rails 102 and 104 of the flat panel. When the panel is withdrawn from the frame, the stop springs will engage recesses 126 and 128, respectively, in the panel rails. The stop springs will, thus, prevent the panel from being completely withdrawn from the frame.

In order to utilize the vanity mirror assembly 80, a button 130, which is readily accessible, will be depressed to release a latch 132 on the mirror housing. The button 130 may contain an optional light (not shown) so that the button may be found easily in the dark. The force of the spring 118 will then urge and move the panel and mirror housing outward slightly from the frame open end 90. The user will then be able to grasp the mirror housing 94 and move the housing and panel linearally from the storage position shown in FIG. 5 to the withdrawn position shown in FIG. 6. Thereafter, the mirror housing, and its accompanying mirror will be moved radially from a position aligned with the panel as shown in FIG. 6, to a position in angular relation to the panel as shown in FIG. 4. The angular position of the mirror can be adjusted to suit the height and position of the user.

After usage, the reverse procedure is performed.

The electric lights 96 and 98 terminate in a pair of leads such as copper strips 134 and 136, one being positive and the other negative. When the panel is extracted to the position shown in FIG. 6, the leads 134 and 136 will connect with contacts 138 and 139 in the frame as is shown. The leads are routed through the hinge pins 108 and 110. The contact is thus continuous into the panel where the leads will connect with the contacts. The leads 134 and 136 are curved either up or down through a slot in the panel, thus allowing contact with 138 and 139 which are either placed at the base or top of the track of the frame. The contacts 138 and 139 are connected with electrical power of the vehicle. Voltage is, thus, supplied to the lights.

In this manner, the lights 96 and 98 are only illuminated when the panel is withdrawn from the frame.

FIG. 7 illustrates a cross-section of a portion of a vehicle headliner 140 which covers the interior roof of a vehicle. The description of the vanity mirror assembly in FIG. 7 is with respect to the embodiment shown in FIG. 1 although it would apply equally to the FIG. 4 embodiment. A windshield 142 is in front of and adjacent placement of a sunvisor 144.

The headliner 140 is contoured so that it bends downward away from the roof at reference numeral 146 thereby creating a recess or pocket. The headliner contains an opening mating with the opening 18 of the frame 12.

The vanity mirror assembly 10 is shown in FIG. 7 in the use position wherein the flat panel 22 is partially removed from the frame 12 and the mirror housing 32 and its accompanying mirror 30 are in angular relation to the panel.

FIG. 8 is a cross-sectional, enlarged view of the operation of the button and latch mechanism to retain the mirror in the stored position. The button and latch mechanism will be described in relation to the FIG. 1 embodiment. The spring 48 on the cross support 15 (not seen in FIG. 8) provides a force on the panel and in turn on the mirror housing 32 as illustrated by arrow 150. FIG. 8 shows the panel in the stored, compressed position. When the user releases the leading edge the latch 62 will slide forward to the edge of the frame opening on 152. In this rested position the latch 62 is above and on the curved portion of button 60.

The latch 62 shown in the embodiment includes a spring biased protrusion which engages a recess 152 in the frame 12. When the button 60 is depressed by the user, it moves the protrusion of the latch 62 so that the force of the spring allows the mirror housing to move outward (in the direction shown by arrow 150). It may then be easily grasped by the user and moved to the use position.

The button 60 may be hinged to the frame 12 as shown and may be an integral part of the frame. A flat spring (not shown) placed above the button 60 and riveted to the frame 12 could be employed to encourage the button to return to the rested position.

Whereas, the present invention has been described in relation to the drawings attached hereto, it should be understood that other and further modifications, apart from those shown or suggested herein, may be made within the spirit and scope of this invention.

What is claimed is:

1. A vanity mirror assembly, which comprises:
   a frame having a pair of opposed tracks;
   a panel having a pair of parallel rails slidable in said tracks;
   a mirror slidable in said tracks; and
   a hinge connecting said panel and said mirror about an axis perpendicular to said parallel rails to allow radial movement of said mirror between a position aligned with said panel and a position in angular relation to said panel.

2. A vanity mirror assembly as set forth in claim 1 wherein said frame is recessed in a vehicle headliner.

3. A vanity mirror assembly as set forth in claim 1 wherein said panel includes a light.

4. A vanity mirror assembly as set forth in claim 1 wherein said mirror includes a housing having a light.

5. A vanity mirror assembly as set forth in claim 1 wherein said panel has a leading edge connected to said mirror by said hinge and a trailing edge which engages a spring on said frame to urge said panel and mirror from said frame.

6. A vanity mirror assembly as set forth in claim 1 including at least one stop spring on said frame which rides along at least one said rail and engages a recess in said panel.

7. A vanity mirror assembly as set forth in claim 6 including a latch which retains said panel and mirror within said opposed tracks.

8. A vanity mirror assembly, which comprises:
   a frame having a pair of opposed tracks;
   a panel having a pair of parallel rails slidable in said tracks;
   a mirror slidable in said tracks and hinged to said panel; and
   means to move said panel and said mirror between a storage position wherein said mirror and panel are aligned in the same plane and a use position wherein said mirror is in angular relation to said panel.

9. A vanity mirror assembly as set forth in claim 8 wherein said frame is recessed in a vehicle headliner.

10. A vanity mirror assembly as set forth in claim 8 wherein said panel includes a light.

11. A vanity mirror assembly as set forth in claim 8 wherein said mirror includes a housing having a light.

12. A vanity mirror assembly as set forth in claim 8 wherein said panel has a leading edge hinged to said mirror and a trailing edge which engages a spring on said frame to urge said panel and said mirror away from said storage position.

13. A vanity mirror assembly as set forth in claim 8 including at least one stop spring on said frame which rides along at least one said rail and engages a recess in said panel.

14. A vanity mirror assembly as set forth in claim 8 including a latch which retains said panel and mirror within said opposed tracks.

15. A method to use and store a vanity mirror assembly, which comprises:

unlatching and releasing a panel having a pair of parallel rails and a mirror within a frame;

sliding said panel rails and mirror from within a storage position within a frame having a pair of opposed tracks so that said mirror is extracted from said frame; and moving said mirror radially from a position aligned with said panel to a position in angular relation to said panel.

16. A method to use and store a vanity mirror assembly as set forth in claim 15 including the additional step of powering a light in said panel only when said mirror is extracted from said frame.

17. A method to use and store a vanity mirror assembly as set forth in claim 15 including the additional step of powering a light in a housing of said mirror only when said housing is extracted from said frame.

18. A method to use and store a vanity mirror assembly as set forth in claim 15 including the additional step of urging said panel and said mirror from said storage position with a spring mounted on said frame.

* * * * *